United States Patent
Ito et al.

(10) Patent No.: US 9,190,887 B2
(45) Date of Patent: Nov. 17, 2015

(54) MOTOR ASSEMBLY AND PUMP APPARATUS INCLUDING A COOLING FAN FOR COOLING AN INVERTER

(75) Inventors: Shoji Ito, Tokyo (JP); So Kuroiwa, Tokyo (JP); Masakazu Komai, Tokyo (JP); Masaki Watanabe, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 344 days.

(21) Appl. No.: 13/876,709

(22) PCT Filed: Oct. 6, 2011

(86) PCT No.: PCT/JP2011/073051
§ 371 (c)(1),
(2), (4) Date: Mar. 28, 2013

(87) PCT Pub. No.: WO2012/046794
PCT Pub. Date: Apr. 12, 2012

(65) Prior Publication Data
US 2013/0181554 A1 Jul. 18, 2013

(30) Foreign Application Priority Data
Oct. 7, 2010 (JP) ................ 2010-227304

(51) Int. Cl.
*H02K 9/16* (2006.01)
*H02K 9/14* (2006.01)
*H02K 11/00* (2006.01)

(52) U.S. Cl.
CPC .. *H02K 9/16* (2013.01); *H02K 9/14* (2013.01); *H02K 11/0073* (2013.01)

(58) Field of Classification Search
CPC ............. H02K 9/16; H02K 9/14; H02K 9/04; H02K 9/06; H02K 5/20; H02K 5/18
USPC ................................. 310/58, 59, 64
See application file for complete search history.

(56) References Cited

U.S. PATENT DOCUMENTS 4,963,778 A    10/1990   Jensen et al.
5,763,969 A *   6/1998   Metheny et al. ............. 310/58
(Continued)

FOREIGN PATENT DOCUMENTS

CN    1375922 A    10/2002
FR    2756676 A1 *  6/1998  ............ H02K 9/06
JP    55-45677 U    3/1980
(Continued)

OTHER PUBLICATIONS

Machine translation of JP 2009278807 A (Nov. 2009).*
(Continued)

*Primary Examiner* — Michael Andrews
(74) *Attorney, Agent, or Firm* — Pearne & Gordon LLP

(57) ABSTRACT

A motor assembly includes a motor, an inverter for changing rotational speed of the motor, a cooling fan coupled to a rotational shaft of the motor, a guide cover for guiding a gas flow generated by rotation of the cooling fan to the inverter, and at least two support members coupling the inverter to a side surface of the motor. The support members are located on both sides of a center line connecting a central axis of the motor to a center of the inverter as viewed from an axial direction of the motor. A space serving as a passage of the gas flow from the cooling fan is formed between the support members.

8 Claims, 7 Drawing Sheets

(56) References Cited

U.S. PATENT DOCUMENTS

2009/0267432 A1* 10/2009 Henry et al. .................... 310/71
2009/0289513 A1* 11/2009 Vadillo et al. ................... 310/62

FOREIGN PATENT DOCUMENTS

| JP | 59-165941 A | 9/1984 |
| JP | 4-242 A | 1/1992 |
| JP | 11-234954 A | 8/1999 |
| JP | 2001-275301 A | 10/2001 |
| JP | 2002-272180 A | 9/2002 |
| JP | 2007-306741 A | 11/2007 |
| JP | 2008-271730 A | 11/2008 |
| JP | 2009-278807 A | 11/2009 |
| JP | 2009-278809 A | 11/2009 |
| JP | 2009-278811 A | 11/2009 |
| JP | 2009278807 A * | 11/2009 ............... H02K 9/02 |

OTHER PUBLICATIONS

Machine translation of FR 2756676 A1 (Jun. 1998).*
International Search Report for PCT/JP2011/073051 dated Dec. 27, 2011.

* cited by examiner

MOTOR ASSEMBLY AND PUMP APPARATUS INCLUDING A COOLING FAN FOR COOLING AN INVERTER

TECHNICAL FIELD

The present invention relates to a motor assembly and a pump apparatus, and especially relates to a motor assembly having a cooling structure for efficiently cooling an inverter.

BACKGROUND ART

A motor is widely used as a drive source for driving a pump. Recently, an inverter-integrated pump motor, in which an inverter is mounted to a motor, is becoming mainstream. The inverter has a power switching element (e.g., Insulated Gate Bipolar Transistor (IGBT), power MOS FET, or the like). With use of such a power switching element, the inverter can change input power of the motor and can thus operate the motor at variable speeds.

During driving of such pump motor, the inverter and the motor generate heat. In particular, the power switching element of the inverter generates high heat while it has a small surface area. As a result, the inverter is heated to have a high temperature. Various solutions have been conventionally proposed for cooling the inverter. For example, as shown in FIGS. 1A and 1B, there has been known a construction in which the inverter is cooled by a cooling fan for cooling the motor.

In the example shown in FIGS. 1A and 1B, a cooling fan 108 is mounted to a rotational shaft 103 of a motor 101 for driving a pump. A circular guide cover 110 is provided on the motor 101 so as to cover the cooling fan 108. A gap is formed between the guide cover 110 and the motor 101. Therefore, gas flow, generated by rotation of the cooling fan 108, advances through the gap along an outer circumferential surface of the motor 101 to cool the motor 101, while a part of the gas flow cools the inverter 105. An axial flow fan or a diagonal flow fan is used as the cooling fan 108, because mounting of this type of fan is easy and its major purpose is to cool the motor 101.

However, in the conventional cooling structure shown in FIGS. 1A and 1B, there exist the following drawbacks. The inverter 105 is coupled to a side surface of the motor 101 through a support member 111. From a viewpoint of facilitating its coupling structure, this support member 111 is typically arranged on a center line connecting the motor 101 to the inverter 105 when viewed from above. The support member 111 arranged in such a position prevents the gas flow delivered from the cooling fan 108 as shown in FIG. 1C, and as a result a cooling efficiency of the inverter 105 is lowered. In particular, use of a larger inverter 105 necessitates use of a larger support member 111, which would greatly disturb the gas flow for cooling the inverter 105.

When the axial flow fan is used as the cooling fan 108, the inverter 105 may not be cooled sufficiently because of a low flow rate of gas. In particular, the inverter 105, when used to drive the motor 101 for driving a pump requiring a large shaft power, is necessarily large. The axial flow fan cannot produce the gas flow powerful enough to cool such large inverter 105. Furthermore, when the axial flow fan or the diagonal flow fan is used, the gas flow directly strikes the motor 101 firstly, and thereafter its secondary gas flow strikes the inverter 105. As a result, the cooling efficiency of the inverter 105 is lowered.

CITATION LIST

Patent Literatures

Japanese laid-open patent publication No. 2009-278807
Japanese laid-open patent publication No. 2009-278809
Japanese laid-open patent publication No. 2009-278811

SUMMARY OF INVENTION

Technical Problem

The present invention has been made in order to solve the above-mentioned conventional drawbacks, and therefore it is an object of the present invention to provide a motor assembly having a cooling structure capable of sufficiently cooling an inverter adjacent to a motor.

Solution To Problem

In order to achieve the above-mentioned object, one aspect of the present invention provides a motor assembly including: a motor to be coupled to a pump; an inverter for changing a rotational speed of the motor; a cooling fan coupled to a rotational shaft of the motor and mounted to an end portion of the motor at an opposite side of the pump; a guide cover for guiding gas flow, generated by rotation of the cooling fan, to the inverter; and at least two support members coupling the inverter to a side surface of the motor. The support members are located on both sides of a center line connecting a central axis of the motor to a center of the inverter as viewed from an axial direction of the motor. A space serving as a passage of the gas flow from the cooling fan is formed between the support members.

In a preferred aspect of the present invention, one of the at least two support members has a through-hole through which a power line extends.

In a preferred aspect of the present invention, the inverter has a power switching element and a box for housing the power switching element therein, and the power switching element in the box is arranged adjacent to the passage of the gas flow.

In a preferred aspect of the present invention, the cooling fan is a centrifugal fan.

In a preferred aspect of the present invention, a part of the inverter is located radially outwardly of the cooling fan.

In a preferred aspect of the present invention, a sound absorbing material or a damping material is attached to an inner surface of the guide cover.

In a preferred aspect of the present invention, a top of the guide cover and a top of the inverter lie in the same plane.

Another aspect of the present invention provides a pump apparatus including the above-described motor assembly and a pump which is driven by the motor assembly.

Advantageous Effects of Invention

According to the present invention, the gas flow generated by the cooling fan advances along the surface of the inverter without being disturbed by the support members. Therefore, the inverter can be efficiently cooled by this gas flow.

DESCRIPTION OF EMBODIMENTS

Hereinafter, embodiments of the present invention will be explained with reference to the figures.

Figure 1A:
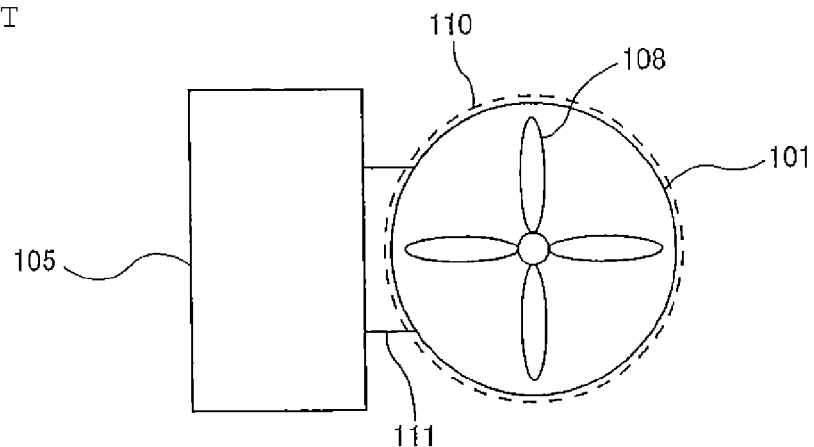
FIG. 1A is a plan view showing a motor assembly having a conventional inverter cooling structure.
Figure 1B:
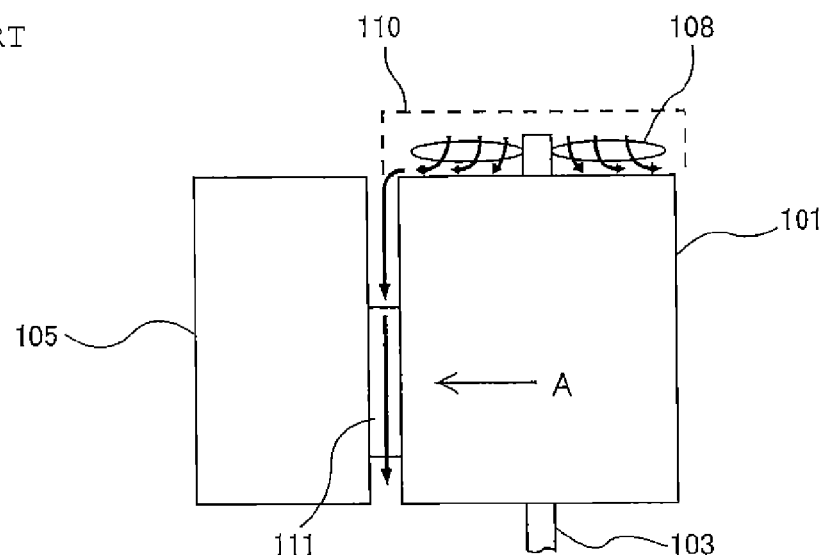
FIG. 1B is a schematic view of the motor assembly shown in FIG. 1A.
Figure 1C:
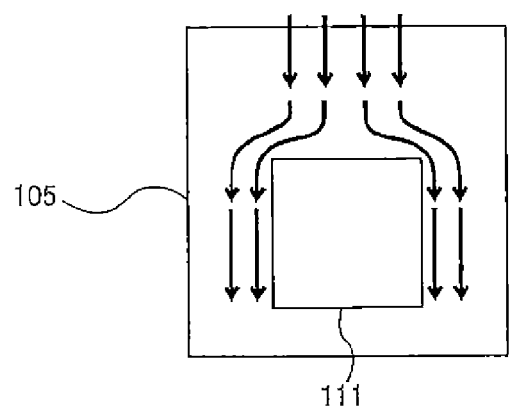
FIG. 1C is a view of an inverter and a support member shown in FIG. 1A as viewed from a direction indicated by arrow A.
Figure 2:
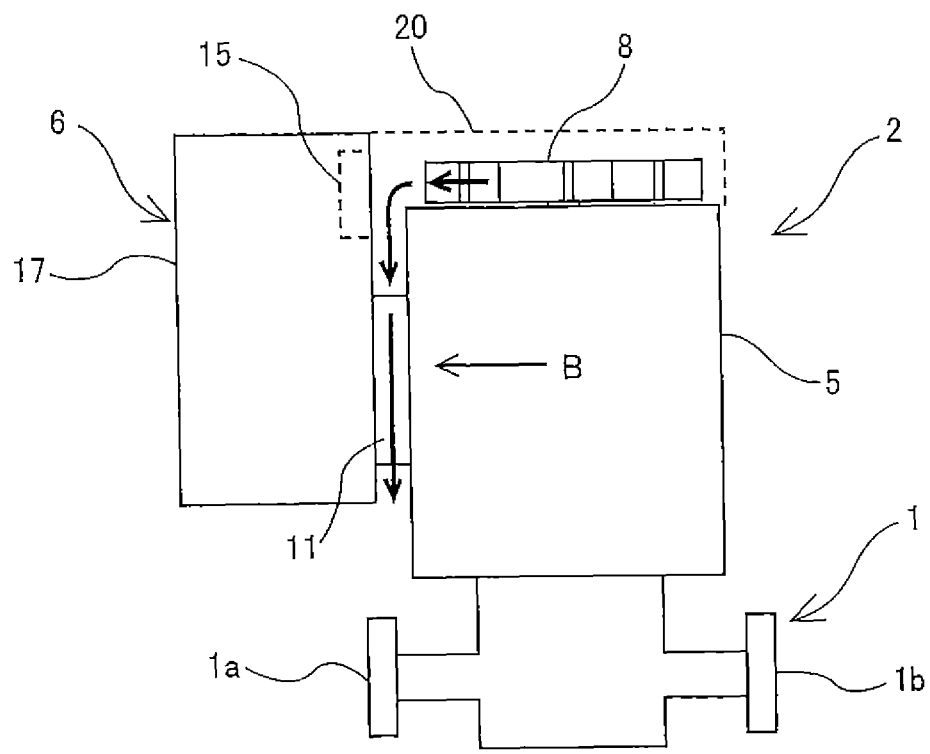
FIG. 2 is a schematic view showing a pump apparatus including a motor assembly according to an embodiment of the present invention.

FIG. 2 is a schematic view showing a pump apparatus including a motor assembly according to an embodiment of the present invention. This pump apparatus includes a pump 1 for delivering fluid and a motor assembly 2, according to the embodiment of the present invention, for driving the pump 1. The motor assembly 2 includes a motor 5 coupled to the pump 1, an inverter 6 for changing a rotational speed of the motor 5, and two support members 11 for coupling the inverter 6 to the motor 5.

A synchronous motor, which uses a permanent magnet in a rotor, is used as the motor 5. This type of motor (i.e., permanent magnet motor) is more efficient than a general motor, and therefore has a characteristic that heat generation is low. However, another type of motor may be used in the motor assembly of the present invention.

The pump 1 is driven by the motor assembly 2, so that the fluid is sucked through a suction opening 1a, pressured, and discharged through a discharge opening 1b. One example of the pump 1 is a centrifugal pump. However, another type of pump may be used.

Figure 3:
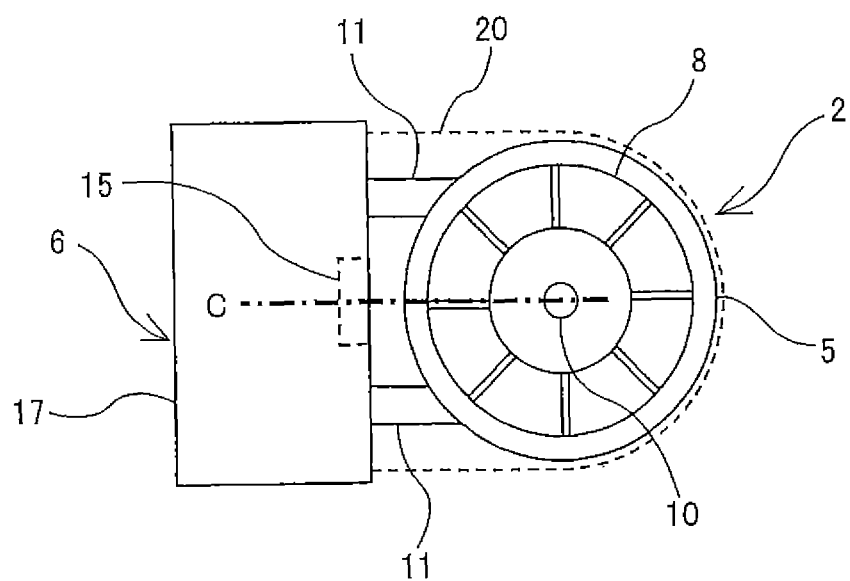
FIG. 3 is a plan view of the motor assembly shown in FIG. 2.
Figure 4:
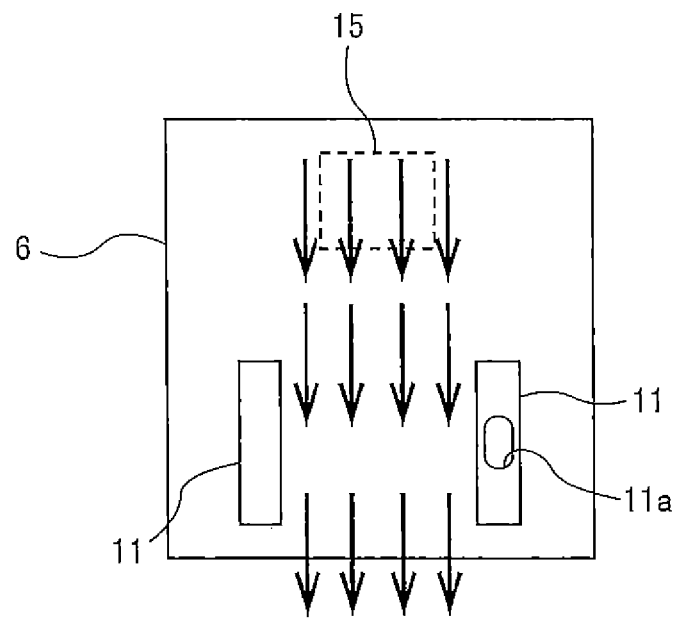
FIG. 4 is a view of an inverter and support members shown in FIG. 2 as viewed from a direction indicated by arrow B.

FIG. 3 is a plan view of the motor assembly shown in FIG. 2, and FIG. 4 is a view of the inverter and the support members shown in FIG. 2 as viewed from a direction indicated by arrow B. A cooling fan 8 is arranged on an upper portion of the motor 5 (i.e., an end portion at the opposite side of the pump). This cooling fan 8 is coupled to a rotational shaft 10 of the motor 5. Therefore, the cooling fan 8 is rotated together with the rotational shaft 10 of the motor 5.

The inverter 6 includes a power switching element 15, a control board (not shown in the figures) for controlling action of the power switching element 15, and a box 17 for housing the power switching element 15 and the control board therein. The power switching element 15 is fixed to the box 17 such that the power switching element 15 is in contact with an inner surface of a bottom of the box 17. The bottom of the inverter 6 faces the motor 5, and the inverter 6 is arranged adjacent to the motor 5.

The cooling fan 8 is a centrifugal fan which is configured to suck the fluid from an axis direction thereof and discharge the fluid radially outwardly. Examples of the centrifugal fan to be used include a radial fan, a turbo fan, and a sirocco fan. By using such centrifugal fan for the cooling fan 8, gas flow with a high flow rate can be formed. In the example shown in the figures, the radial fan is used as the cooling fan 8.

Figure 5A:
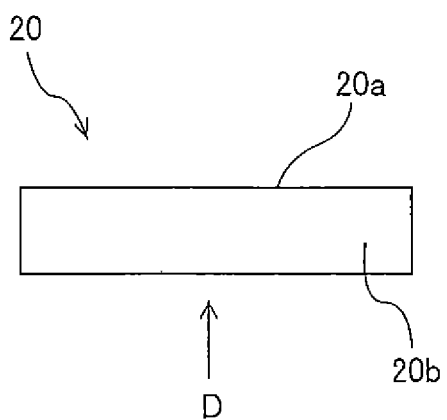
FIG. 5A is a side view showing a guide cover.
Figure 5B:
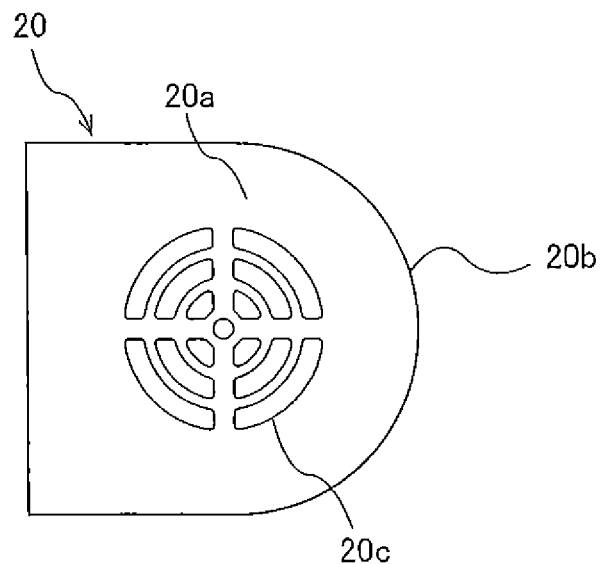
FIG. 5B is a view of the guide cover shown in FIG. 5A as viewed from a direction indicated by arrow D.

As shown in FIG. 3, a guide cover 20 is provided above the motor 5 so as to cover the cooling fan 8. This guide cover 20 serves to guide the gas flow, generated by the rotation of the cooling fan 8, to the inverter 6. FIG. 5A is a side view showing the guide cover 20, and FIG. 5B is a view of the guide cover shown in FIG. 5A as viewed from a direction indicated by arrow D. The guide cover 20 has a flat portion 20a having a gas intake (an air intake) 20c, and a side portion 20b having a U-shaped configuration when viewed from below. As the cooling fan 8 is rotated, ambient gas (typically air) flows into the guide cover 20 through the air intake 20c and is then delivered to the inverter 6 along the side portion 20b of the guide cover 20. As shown in FIG. 3, a gap is formed between the guide cover 20 and the motor 5 when viewed from the axial direction of the motor 5. A part of the gas flow, generated by the rotation of the cooling fan 8, advances through this gap along an outer circumferential surface of the motor 5 to thereby cool the motor 5.

The inverter 6 is coupled to a side surface of the motor 5 by two support members 11. As shown in FIG. 3, these support members 11 are arranged on both sides of a center line (indicated by reference sign C) connecting a central axis of the motor 5 to a center of the inverter 6 when viewed from the axial direction of the motor 5. Specifically, these support members 11 are disposed at positions spaced apart from the center line C. As shown in FIG. 4, each of the support members 11 has a plate shape, and extends along the rotational shaft 10 (central axis) of the motor 5 so as to avoid disturbing the gas flow.

In the present embodiment, the two support members 11 are arranged symmetrically in such positions that the above-mentioned center line C is interposed between the support members 11. The power switching element 15 of the inverter 6 is located on the center line C. The two support members 11 are spaced apart from each other so as to form a space therebetween. This space serves as a passage of the gas flow delivered from the cooling fan 8. One of the two support members 11 has a through-hole 11a through which a power line extends from the inverter 6 to the motor 5.

A part of the inverter 6 (an upper portion thereof) is located radially outwardly of the cooling fan 8. Therefore, the gas flow, generated by the rotation of the cooling fan 8, strikes the upper portion of the inverter 6 to change its direction of movement, and advances downward through the space between the inverter 6 and the motor 5. The support members 11 are spaced apart from the center line C so as not to prevent the movement of the gas flow, and the passage of the gas flow is formed between the support members 11 as shown in FIG. 4. The inverter 6 is cooled by the gas flow that advances on its outer surface along the central axis of the motor 5.

In this embodiment, the centrifugal fan, such as the radial fan, is used as the cooling fan 8, as described above. Therefore, the cooling fan 8 can generate strong gas flow and can thus further improve a cooling effect of the inverter 6. Moreover, the gas flow, advancing through the space between the motor 5 and the inverter 6, can cool the motor 5 simultaneously.

The power switching element 15 of the inverter 6 is located adjacent to the passage of the gas flow delivered from the cooling fan 8. Therefore, the gas, delivered from the cooling fan 8, can cool the power switching element 15. In particular, as shown in FIG. 2, it is preferable that the power switching element 15 be located radially outwardly of the cooling fan 8. By arranging the power switching element 15 at such a position, the cooling effect of the power switching element 15 can be improved, because the gas flow strikes a wall surface of the box 17 lying at a back side of the power switching element 15.

In the embodiment shown in FIG. 2, the inverter 6 and the guide cover 20 are disposed on the same plane (which is a virtual plane) perpendicular to the rotational shaft 10 of the motor 5. More specifically, a top of the inverter 6 (an end portion at the opposite side of the pump) and a top of the guide cover 20 (i.e., the flat portion 20a) lie in the same plane. The motor assembly 2 having such an arrangement can have an end surface with no concave and convex.

Figure 6:
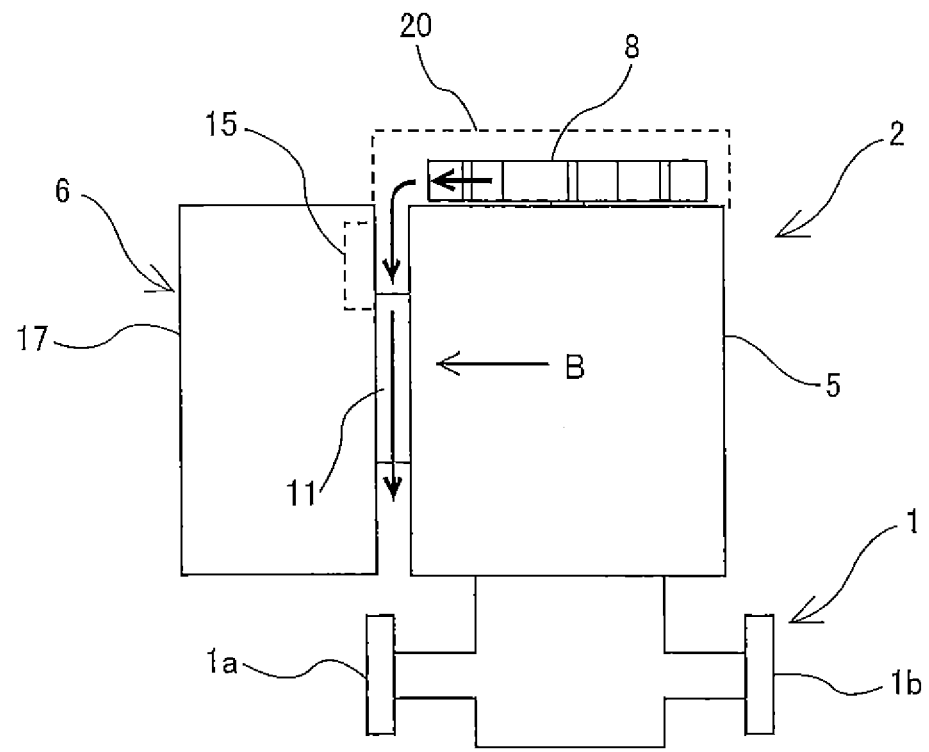
FIG. 6 is a view showing an example of the motor assembly in which an upper end of the inverter lies below a cooling fan.

In the embodiment shown in FIG. 2, a part of the inverter 6 is located radially outwardly of the cooling fan 8. In another embodiment, as shown in FIG. 6, the inverter 6 may not be located radially outwardly of the cooling fan 8. In this case, the guide cover 20 preferably has the side portion 20b surrounding the cooling fan 8 in its entirety. The gas flow, formed by the cooling fan 8, strikes the side portion 20b of the guide cover 20 to change its direction of movement toward the inverter 6, so that the gas flows along the outer surface of the inverter 6. In this case also, the power switching element 15 of the inverter 6 is arranged adjacent to the passage of the gas flow. Therefore, the power switching element 15 is cooled by the gas flow through the box 17 of the inverter 6.

Figure 7A:
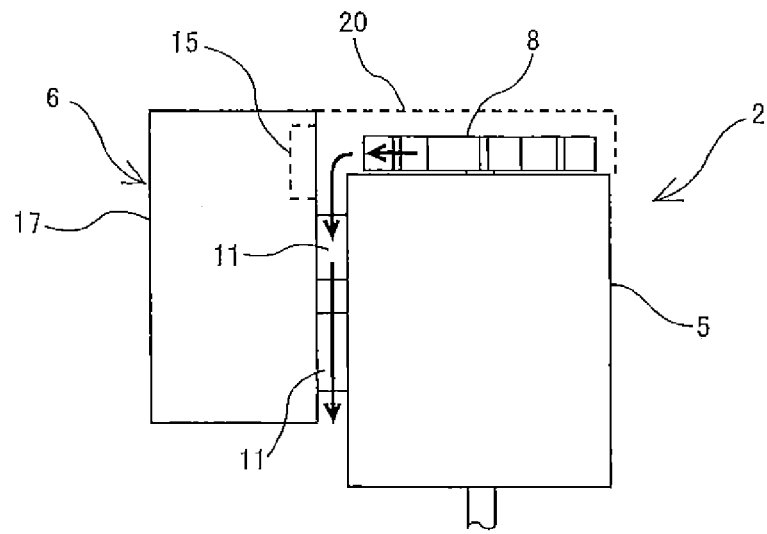
FIG. 7A is a view showing an example in which the inverter is coupled to a side surface of the motor by four support members.
Figure 7B:
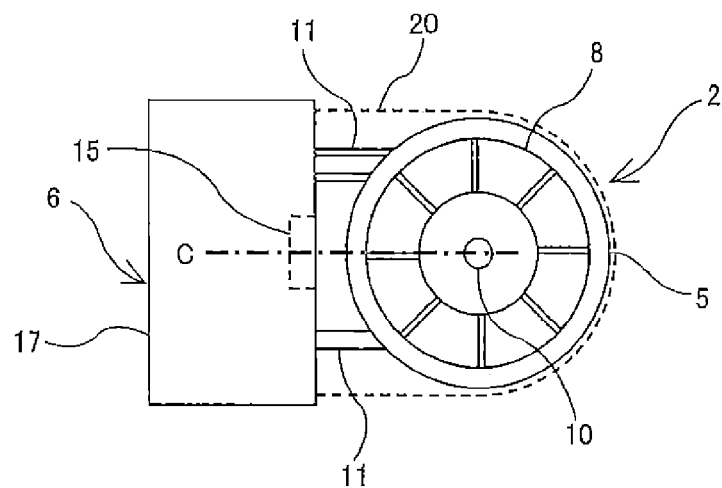
FIG. 7B is a view showing the example in which the inverter is coupled to the side surface of the motor by the four support members.
Figure 7C:
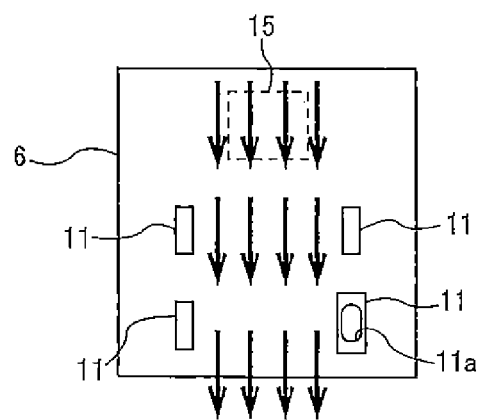
FIG. 7C is a view showing the example in which the inverter is coupled to the side surface of the motor by the four support members.

FIGS. 7A to 7C are views showing an example in which the inverter 6 is coupled to the side surface of the motor 5 by four support members 11. As shown in FIGS. 7A to 7C, the number of support members 11 is not limited to two, and may be three or more. In the embodiment shown in FIGS. 7A to 7C, the four support members 11 are provided. More specifically, two pairs of support members 11 are arranged along the central axis of the motor 5. As is the case in the embodiment shown in FIG. 4, the passage for the gas flow delivered from the cooling fan 8 is formed between each pair of support members 11. One of the four support members 11 has the through-hole 11a through which the power line extends. It is not necessary that all support members 11 have the same size. For example, the support member 11 not having the through-hole 11a may be smaller than the support member 11 having the through-hole 11a.

Figure 8A:
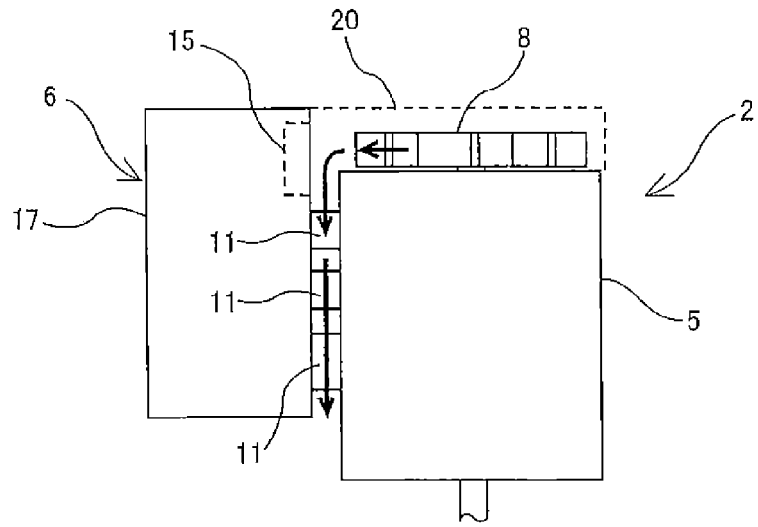
FIG. 8A is a view showing an example in which the inverter is coupled to the side surface of the motor by six support members.
Figure 8B:
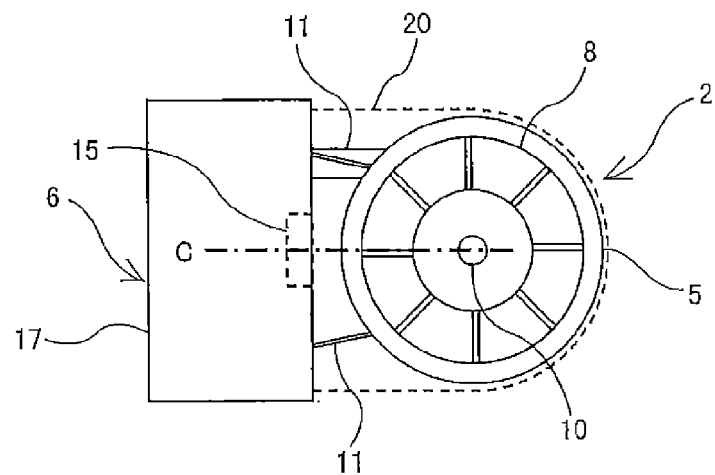
FIG. 8B is a view showing the example in which the inverter is coupled to the side surface of the motor by the six support members.
Figure 8C:
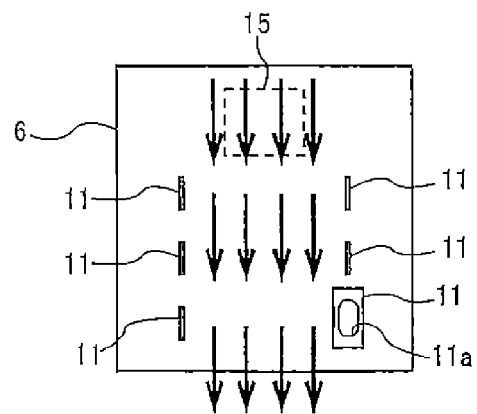
FIG. 8C is a view showing the example in which the inverter is coupled to the side surface of the motor by the six support members.

FIGS. 8A to 8C are views showing an example in which the inverter 6 is coupled to the side surface of the motor 5 by six support members 11. In the embodiment shown in FIG. 8, three pairs of support members 11 are arranged along the central axis of the motor 5. The support members 11 not having the through-hole 11a may have a thin plate shape as shown in FIG. 8.

Figure 9:
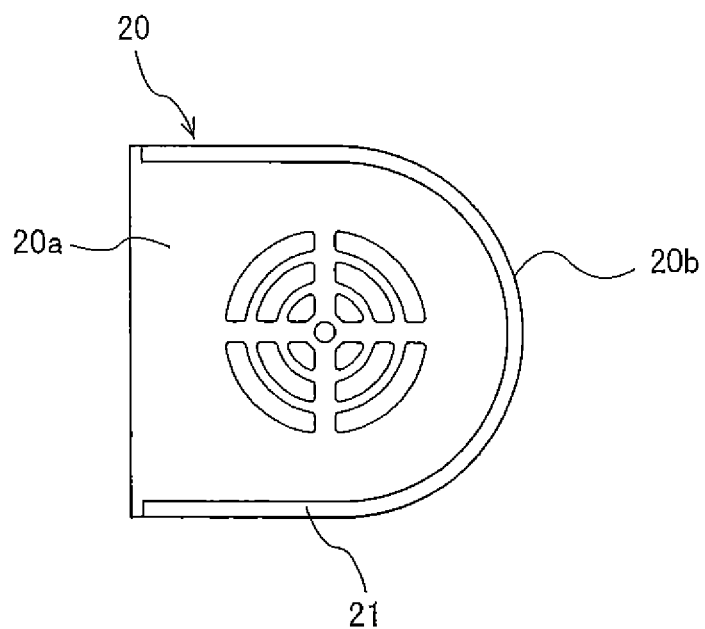
FIG. 9 is a view showing an example in which a sound absorbing material or a damping material is attached on an inner surface of the guide cover.

During operation of the motor assembly 22, the motor 5 and the cooling fan 8 generate noises. Therefore, in order to reduce such noises, a sound absorbing material or a damping material is preferably attached to an inner surface of the guide cover 20. FIG. 9 is a view showing an example in which the sound absorbing material or the damping material is attached to the inner surface of the side portion 20b of the guide cover 20. In FIG. 9, the sound absorbing material or the damping material is denoted by reference numeral 21. In a case of using such configuration, slightly larger guide cover 20 is preferably used, as compared with the case of not providing the sound absorbing material or the damping material.

The sound absorbing material is a member which absorbs sounds by taking the sounds therein and converting sound energy into thermal energy. Examples of the sound absorbing material include sponge and urethane foam. The damping material is a member which reduces vibration of a solid material by converting vibration energy of the solid material into thermal energy. Examples of the damping member include a rubber plate and a plastic plate.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims and equivalents.

INDUSTRIAL APPLICABILITY

The present invention is applicable to a motor assembly having a cooling structure for efficiently cooling an inverter.

The invention claimed is:

1. A motor assembly comprising:
a motor configured to be coupled to a pump;
an inverter for changing a rotational speed of said motor;
a cooling fan coupled to a rotational shaft of said motor the cooling fan being located at a side of said motor opposite from the pump;
a guide cover for guiding gas flow, generated by rotation of said cooling fan, to said inverter; and
at least two support members coupling said inverter to a side surface of said motor;
wherein said at least two support members are located on both sides of a center line, the center line connecting a central axis of said motor to a center of said inverter as viewed from an axial direction of said motor,
wherein a space serving as a passage of the gas flow from said cooling fan is formed between said at least two support members,
wherein one of said at least two support members has a through-hole through which a power line extends,
wherein said inverter has a power switching element and a box in which said power switching element is housed, said power switching element in said box is arranged adjacent to said passage of the gas flow, and said power switching element is located on the center line, and
wherein an upper portion of said inverter is located radially outwardly of said cooling fan such that the gas flow, generated by the rotation of said cooling fan, contacts said upper portion of said inverter to change a direction of movement of the gas flow downward through the space between said at least two support members.

2. The motor assembly according to claim 1, wherein said cooling fan is a centrifugal fan.

3. The motor assembly according to claim 1, wherein a top surface of said guide cover and a top surface of said inverter lie in a same plane which is perpendicular to said rotational shaft of said motor.

4. A pump apparatus comprising:
   said motor assembly according to claim 1; and
   a pump driven by said motor assembly.

5. The motor assembly according to claim 1, wherein said motor is a synchronous motor which uses a permanent magnet in a rotor.

6. The motor assembly according to claim 1, wherein said guide cover has a flat portion having a gas intake and a U-shaped side portion.

7. The motor assembly according to claim 1, wherein each of said at least two support members comprises two support members.

8. The motor assembly according to claim 1, wherein said power switching element is located radially outwardly of said cooling fan.

\* \* \* \* \*